(12) United States Patent
Yen

(10) Patent No.: US 6,248,198 B1
(45) Date of Patent: Jun. 19, 2001

(54) PROCESS FOR MANUFACTURE OF A LAMINATED SHEET

(75) Inventor: Wen Hwa Yen, Trevose Crescent (SG)

(73) Assignee: New Toyo Aluminium Paper Product Co. (PTE) Ltd., Jurong Town (SG)

(*) Notice: Subject to any disclaimer, the term of this patent is extended or adjusted under 35 U.S.C. 154(b) by 0 days.

(21) Appl. No.: 09/194,569

(22) PCT Filed: May 27, 1996

(86) PCT No.: PCT/SG96/00005

§ 371 Date: Apr. 27, 1999

§ 102(e) Date: Apr. 27, 1999

(87) PCT Pub. No.: WO97/45266

PCT Pub. Date: Dec. 4, 1997

(51) Int. Cl.[7] .............................. B32B 31/14; B32B 31/22; B41F 19/02

(52) U.S. Cl. .......................... 156/209; 156/220; 156/277; 428/209; 428/211

(58) Field of Search ........................................ 156/209, 219, 156/220, 277; 428/464, 209, 211; 101/32

(56) References Cited

U.S. PATENT DOCUMENTS

| | | |
|---|---|---|
| 3,247,785 * | 4/1966 | Shultz . |
| 3,300,358 * | 1/1967 | Fournier . |
| 3,594,552 * | 7/1971 | Adamson . |
| 3,681,159 * | 8/1972 | Portnoy et al. . |
| 3,912,842 * | 10/1975 | Swartz .............................. 156/220 X |
| 4,312,686 | 1/1982 | Smith et al. . |
| 4,498,390 * | 2/1985 | Bowling et al. . |
| 4,732,082 * | 3/1988 | Ireton .................................. 101/32 X |
| 5,622,106 * | 4/1997 | Rayner .................................... 101/32 |

FOREIGN PATENT DOCUMENTS

| | | |
|---|---|---|
| 239700 | 12/1959 | (AU) . |
| 259256 | 7/1964 | (AU) . |
| 2 018 680 | 10/1979 | (GB) . |
| 1 580 670 | 12/1980 | (GB) . |
| 6-344649 | 12/1994 | (JP) . |
| WO 94/05501 | 3/1994 | (WO) . |

* cited by examiner

*Primary Examiner*—Curtis Mayes
(74) *Attorney, Agent, or Firm*—Sughrue, Mion, Zinn, Macpeak & Seas, PLLC

(57) ABSTRACT

A process for manufacturing a laminated sheet is disclosed. The first step of the process comprises adhering together a sheet of metal foil (3) and a sheet of paper (4). Thereafter, the process comprises printing an image on an outer surface of the paper (4) or embossing the image on the metal foil (3). Where the image is first printed on the paper (4), the process further comprises the step of embossing a mirror of the image on the metal foil (3) in registration with the printed image. Alternatively, where the image is first embossed on the metal foil (3), the method further comprises printing a mirror of the image on the outer surface of the paper (4) in registration with the embossed image on the metal foil (3).

8 Claims, 3 Drawing Sheets

PROCESS FOR MANUFACTURE OF A LAMINATED SHEET

The present invention relates to a laminated sheet and to a process for manufacturing the laminated sheet.

In particular the present invention relates to a laminated sheet comprising sheets of metal foil and paper and a process for manufacturing the laminated sheet.

Laminated sheets, such as those made of sheets of metal foil and paper, can be used for a variety of functions including wrapping or packaging. Consumer items, such as confectionary, are often wrapped individually or in bundles in laminated sheets, and cigarettes and cigars are often sold in tins or boxes having laminated sheets as a liner. Laminated sheets are particularly useful as liners because the metal foil forms a barrier to light and moisture which could degrade the tobacco.

Laminated sheets are often printed or embossed with "images" such as trade marks, logos or company names of manufacturers or distributors, or other information in order to enhance the presentation of goods wrapped or packaged in the laminated sheets.

In general, laminated sheets are printed or embossed on one side only. Usually, the paper is printed or the metal foil is embossed, but occasionally both the metal foil is printed and the paper is embossed. The printing and embossing is carried out by processes which are well known in printing technology, such as roll to roll embossing and intaglio printing.

While it is well known in the printing and paper industry to produce a laminated sheet comprising an embossed metal foil and printed paper, it has not hitherto been known to provide a laminated sheet on which the printing and embossing are in registration, that is, on which there is exact correspondence of the printed and embossed images.

An object of the present invention is to provide a laminated sheet comprising printed paper and embossed metal foil wherein the printing and embossing are in registration.

A further object of the present invention is to provide a process for manufacturing such a laminated sheet.

According to the present invention there is provided a process for manufacturing a laminated sheet comprising the steps of:

(i) adhering together a sheet of metal foil and a sheet of paper;

(ii) printing an image on an outer surface of the paper, and (iii) embossing a mirror of the image on the metal foil in registration with the printed image on the paper.

According to the present invention there is provided a process for manufacturing a laminated sheet comprising the steps of:

(i) adhering together a sheet of metal foil and a sheet of paper;

(ii) embossing an image on the metal foil; and (iii) printing a mirror of the image on the outer surface of the paper in registration with the embossed image on the metal foil.

As noted above, the order of the printing and embossing steps is not essential. However, it is preferred that the embossing step precede the printing step.

It is particularly preferred that the process comprises detecting the first formed of the printed and embossed images and controlling the subsequent embossing/printing step to ensure registration of the subsequently formed printed and embossed images.

The step of adhering together the sheets of paper and metal foil may be carried out by any suitable method. In a preferred embodiment, the metal foil is passed over a coating roller which applies adhesive to one surface of the metal foil. The paper and metal foil are then passed between a pair of rolls which press the paper and the adhesive coated surface of the metal foil together to form the laminated sheet.

The embossing step may be carried out by any suitable method. In one method of embossing, a workpiece (such as a roller) and embossing die is located on either side of the laminated sheet and brought together so that the die contacts and embosses the foil. In another method of embossing, the workpiece is stationery and the die is moved up and down against the metal foil of the laminated sheet. In another method of embossing, the workpiece is moved against the paper of the laminated sheet, thus pressing the metal foil against the embossing die.

It is preferred that the embossing step comprises feeding the laminated sheet between the nip of two rolls, with one roll acting as a workpiece and being formed from a relatively soft material such as paper, and the other roll acting as a die and being formed from metal, such as steel.

The printing step may be carried out by any suitable method. For example, the printing step may comprise relief or letterpress printing, planographic printing or intaglio printing, such as photogravure or roll to roll gravure.

The laminated sheet of the present invention may have physical characteristics appropriate for the intended use. For example, where it is intended for wrapping confectionery, the laminated sheet may need to be very flexible. Alternatively, where it is intended to line cigarette boxes, it may be necessary that the laminated sheet be relatively rigid so that it can be folded and maintain the folds.

Different physical characteristics of the laminated sheet may be provided in part by choice of adhesive and the grade and type of paper and/or metal foil.

It is preferred that the metal foil comprise a metal chosen form the main group of the periodic table.

It is particularly preferred that the metal foil comprises or consists of aluminium.

Optionally, the process of the present invention comprises colouring the metal foil. Preferably, the colouring step comprises a roll to roll gravure printing process in which the whole surface of the metal foil is coloured by being passed across an inked gravure roll. The coloured ink deposited on the metal foil by the gravure roll may be dried by passing the metal foil through a hot air chamber or the like.

The present invention is described further by way of example with reference to the accompanying drawings in which.

Figure 1:
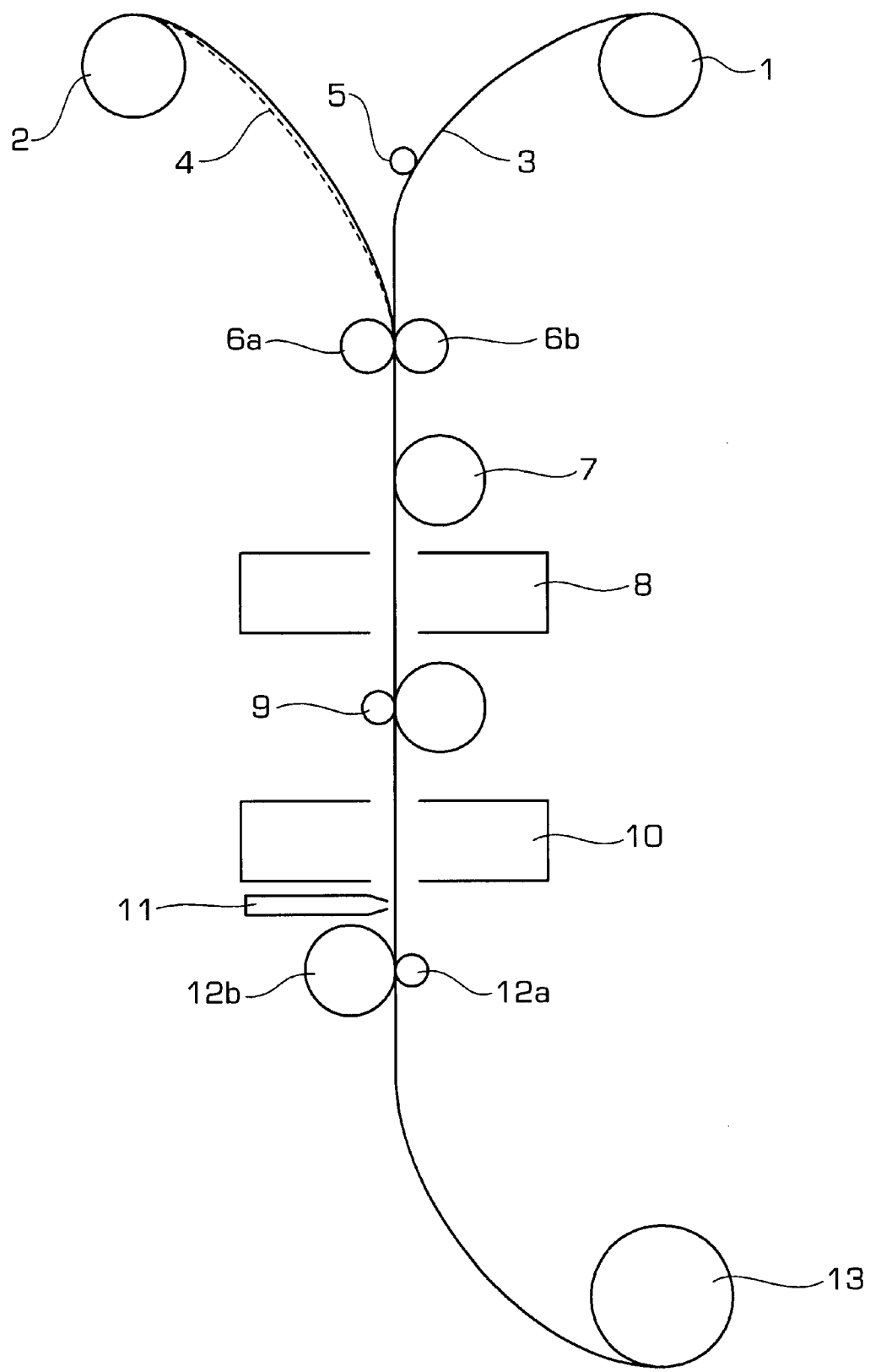
FIG. 1 is a schematic diagram of a preferred embodiment of a process in accordance with the present invention for manufacturing a preferred embodiment of a laminated sheet in accordance with the present invention.

In the process shown in FIG. 1 metal foil (3) and paper (4) are fed from respective reels (1) and (2) and are passed through a series of workstations at which the metal foil (3) and the paper (4) are laminated together, an image is printed on the paper (4), and a "mirror" image is embossed on the metal foil (3).

With reference to FIG. 1, the metal foil (3), typically silver aluminium foil, is passed from the reel (1) over a coating roll (5) which deposits adhesive, preferably as an even film, over one surface of the metal foil (3).

The metal foil (3) and paper (4) from the reel (2) are then passed between two laminating rolls (6a,6b) which press the adhesive coated surface of the metal foil (3) evenly against one surface of the paper (4) to form a laminated sheet.

The outer surface of the metal foil (3) of the laminated sheet is then coloured by transporting the laminated sheet in contact with a gravure roll (7) which deposits a layer of coloured ink on the outer surface of metal foil (3).

The wet ink is dried by passing the laminated sheet through a drying chamber (8) in which hot air is circulated.

The laminated sheet is then passed across a gravure cylinder (9) which leaves a printed image on the outer surface of the paper (4).

The wet ink on the paper is then dried by passing the laminated sheet through another drying chamber (10).

The laminated sheet is then passed to an embossing station which comprises a workpiece (12a) and a die (12b) which embosses on the metal foil (3) a "mirror" image of the printed image on the paper (4). A control assembly which includes a sensor (11) upstream of the embossing workstation detects the printed image on the paper (4) and controls the process by any suitable means to ensure that the embossed "mirror" image on the metal foil (3) is in registration with the printed image on the paper (4)

Finally, the embossed and printed laminated sheet is fed onto a large reel (13) for storage prior to the sheet being cut and spooled onto smaller reels.

Figure 2A:
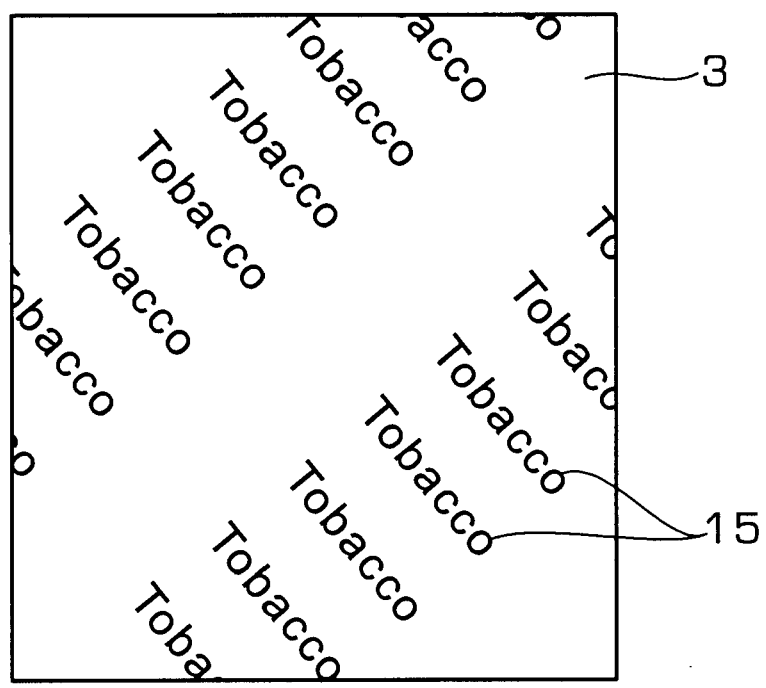
FIG. 2(a) is a plan view of the metal foil surface of the laminated sheet manufactured by the process shown in FIG. 1.
Figure 2B:
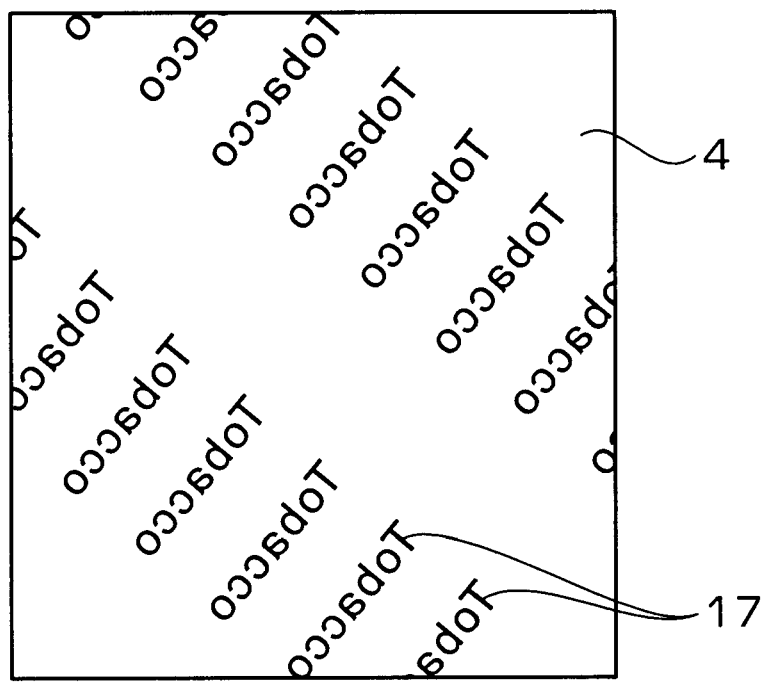
FIG. 2(b) is a plan view of the paper surface of the laminated sheet manufactured by the process shown in FIG. 1.

FIG. 2 (a) shows the outer surface of the metal foil (3) of a section of the laminated sheet manufactured by the process described above on which is embossed an image (15) which comprises an array of the word "tobacco". FIG. 2 (b) shows the outer surface of the paper (4) of the section of the laminated sheet shown in FIG. 2 (a). The outer surface of the paper is marked with a printed image (17) which comprises an array of the word "tobacco". The arrangement is such that there is correspondence in shape, size and position of the embossed and printed images.

Figure 3A:
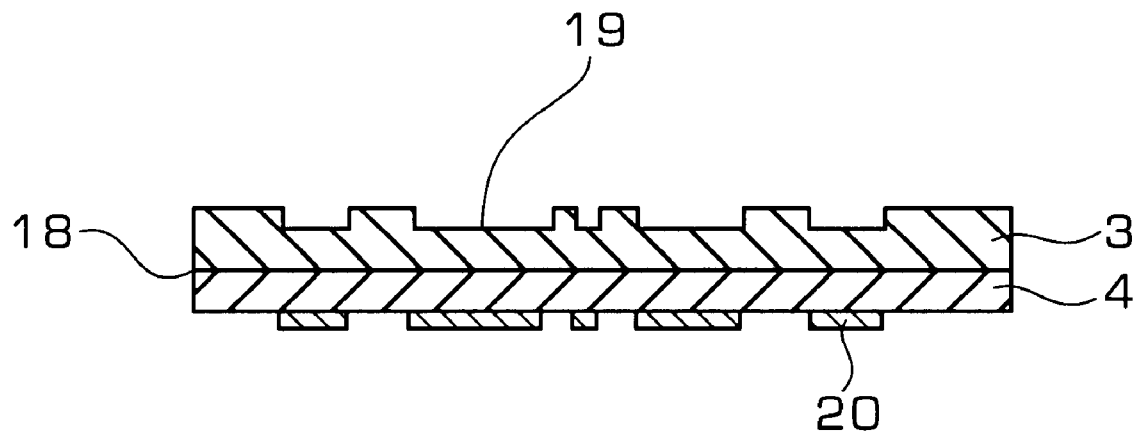
FIGS. 3(a) and 3(b) are a cross section of the laminated sheet shown in FIGS. 2(a) and 2(b).
Figure 3B:
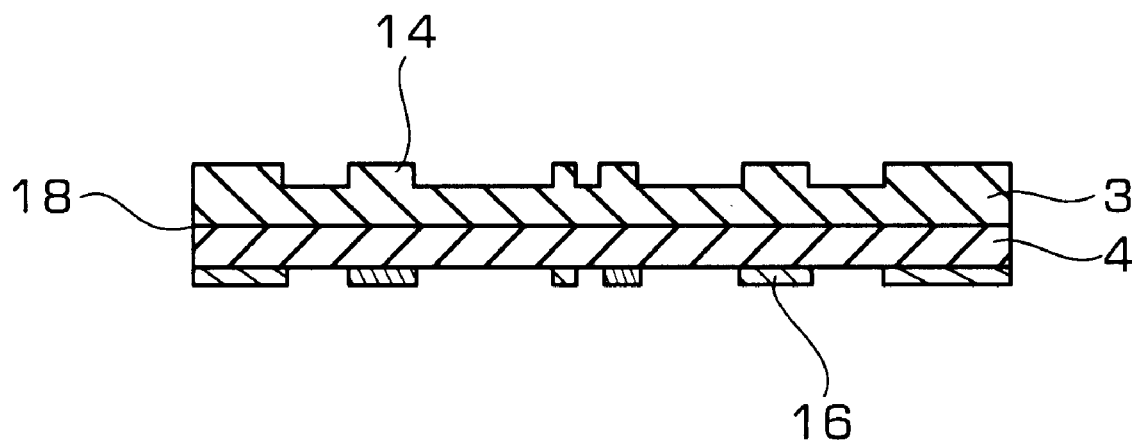

FIG. 3 (a) is an enlargement of a cross section of part of the laminated sheet shown in FIGS. 2 (a) and 2 (b) which shows the metal foil (3) and the paper (4) held together by a thin layer of adhesive (18). The metal foil (3) has impressions (19) where the embossing die has made contact and depressed the surface of the metal foil. As the embossing and printing are in registration, the paper has deposits of ink (20) which correspond to the impressions (19) in the metal foil (3).

FIG. 3 (b) is an enlargement of a cross section of part of the laminated sheet shown in FIGS. 2 (a) and 2 (b) which shows the metal foil (3) and the paper (4) held together by a thin layer of adhesive (18). The metal foil (3) has impressions (14) where the embossing die has not made contact and depressed the surface of the metal foil. As the embossing and printing are in registration, the paper has deposits of ink (16) which correspond to the impressions (14) in the metal foil (3).

It is noted that the particular image shown in FIGS. 2 (a) and 2 (b) is an arbitrary selection and that any suitable image may be embossed and printed on the laminated sheet.

It is also noted that the production of a laminated sheet having embossed and printed mirror images that are in registration is believed to be an important means of enabling purchasers of products, such as tobacco, to distinguish between the products of different traders. In the tobacco industry, the principal benefit is in enabling detection of non-genuine cigarettes.

While the invention has been explained in relation to its preferred embodiments it is to be understood that various modifications thereof will become apparent to those skilled in the technology upon reading the specification.

The claims defining the process are as follows:

1. A process for manufacturing a laminated sheet comprising the steps of:

supplying a moving continuous sheet of metal foil and a moving continuous sheet of paper;

adhering together said moving sheet of metal foil and said moving sheet of paper to form a moving joined web having a paper side and a foil side;

printing an image on an outer surface of the paper side of said moving joined web at a first station;

detecting the image printed on the paper side of said moving joined web; and embossing a mirror of the image on the metal foil side of said moving joined web in registration with the printed image on the paper side of said moving joined web at a second station downstream from said first station.

2. A process for manufacturing a laminated sheet comprising the steps of:

supplying a moving continuous sheet of metal foil and a moving continuous sheet of paper;

adhering together said moving sheet of metal foil and said moving sheet of paper to form a moving joined web having a paper side and a foil side;

embossing an image on the metal foil side of said moving joined web at a first station;

detecting the image embossed on the metal foil side of said moving joined web; and printing a mirror of the image on the outer surface of the paper side of said moving joined web in registration with the embossed image on the metal foil side of said moving joined web at a second station downstream from said first station.

3. The process defined in claim 1 or claim 2 wherein, in response to said detecting step, controlling the subsequent embossing/printing step to effect exact registration of the subsequently formed printed and embossed images.

4. The process defined in claim 1 or claim 2 wherein the adhering step comprises passing the moving sheet of metal foil in contact with a coating roll which applies adhesive to one surface of the metal foil and passing the adhesive-coated metal foil and the moving sheet of paper between the nip of a pair of rolls which press together the paper and the adhesive-coated metal foil to form the laminated sheet.

5. The process defined in claim 1 or claim 2 wherein the metal foil comprises a metal chosen from the main group of the periodic table.

6. The process defined in claim 1 or claim 2 wherein the metal foil comprises aluminum.

7. The process defined in claim 1 or claim 2, wherein said process comprises colouring the metal foil.

8. A laminated sheet manufactured by the process defined in claim 1 or claim 2.

* * * * *